United States Patent [19]
Rink et al.

[11] Patent Number: 6,013,739
[45] Date of Patent: Jan. 11, 2000

[54] POLY(METH-)ACRYLIC RESIN-BASED COATING AGENT WHICH CAN BE CROSS-LINED WITH ISOCYANATE

[75] Inventors: Heinz-Peter Rink; Michael Brünnemann, both of Münster; Ulrike Röckrath, Senden, all of Germany

[73] Assignee: BASF Coatings AG, Muenster-Hiltrup, Germany

[21] Appl. No.: 08/714,037

[22] PCT Filed: Feb. 28, 1995

[86] PCT No.: PCT/EP95/00729

§ 371 Date: Sep. 4, 1996

§ 102(e) Date: Sep. 4, 1996

[87] PCT Pub. No.: WO95/23653

PCT Pub. Date: Sep. 8, 1995

[30] Foreign Application Priority Data

Mar. 5, 1994 [DE] Germany ............................... 44 07 409

[51] Int. Cl.$^7$ .................................................. C08F 283/04
[52] U.S. Cl. .......................................... 525/451; 525/454
[58] Field of Search ..................................... 525/451, 454

[56] References Cited

U.S. PATENT DOCUMENTS 4,212,347 7/1980 Eastman .
5,136,004 8/1992 Bederke et al. ........................ 526/273
5,195,240 3/1993 Shuster et al. .

FOREIGN PATENT DOCUMENTS

A-0 588 314 3/1994 European Pat. Off. .

*Primary Examiner*—John M. Cooney, Jr.

[57] ABSTRACT

The present invention provides a coating composition and a process for producing a multicoat finish therefrom. The coating composition has a binder component obtained by polymerizing: (a) from 10 to 51% by weight of a mixture of hydroxy n-butyl (meth)acrylate(s) and hydroxy n-propyl (meth)acrylate(s), (b) from 0 to 20% by weight of at least one further hydroxyl group-containing monomer, (c) from 28 to 85% by weight of at least one (cyclo)aliphatic (meth) acrylic acid ester, (d) from 0 to 25% by weight of at least one aromatic vinyl compound, (e) from 0 to 5% by weight of at least one unsaturated carboxylic acid, and (f) from 0 to 20% by weight of further monomers, to give a polyacrylate resin having a hydroxyl number of from 60 to 200, an acid number of from 0 to 35, and an Mn of from 1000 to 5000. The coating composition also has a crosslinking component that is a mixture comprising a polyisocyanate having an average functionality of from 3 to 4 and having a uretdione group content of less than 5%, and optionally a polyisocyanate having an average functionality of from 2 to 3 and having a uretdione group content of from 20 to 40%, and optionally a further polyisocyanate.

17 Claims, No Drawings

POLY(METH-)ACRYLIC RESIN-BASED COATING AGENT WHICH CAN BE CROSS-LINED WITH ISOCYANATE

FIELD OF THE INVENTION

The present invention relates to a coating composition comprising (A) at least one hydroxyl group-containing poly-acrylate resin, and (B) at least one crosslinking agent.

The present invention also relates to processes for producing a multicoat protective and/or decorative finish on a substrate surface and to the use of the coating compositions in the sector of automotive refinishing.

BACKGROUND AND SUMMARY OF THE INVENTION

Multilayer coatings, especially two-coat metallic finishes, are produced in particular by the basecoat/clearcoat method. This method is known and is described, for example, in U.S. Pat. No. 3,639,147 and EP-A-38 127.

The basecoat/clearcoat method can be used to produce finishes whose superiority over one-coat finishes is manifested in an enhanced effect and in the possibility of producing finishes with more brilliant and more clean colors.

The basecoat which is applied first of all determines, depending on the nature, quantity and spatial orientation of the pigments employed, the color and, if appropriate, the effect (e.g. metallic effect or pearl luster effect) of the finish.

Following application of the basecoat, at least some of the organic solvents and/or at least some of the water are or is removed from the applied basecoat film in an evaporation phase. A nonaqueous, transparent topcoat is then applied to this predried basecoat (wet-on-wet method). Basecoat and topcoat are then dried together.

The applied transparent topcoat gives the two-coat finish gloss and fullness and protects the pigmented coat applied from chemical and physical attack.

Using the method under discussion, it is only possible to obtain high-quality two-coat finishes if the transparent topcoat applied does not adversely affect the applied basecoat in such a way that the optical effect is impaired (e.g. clouding). On the other hand, the transparent topcoat must have a composition which ensures that it adheres well to the basecoat after the drying process. Further important properties which the transparent topcoat obtained after the drying process is required to have are a high degree of transparency, very good topcoat appearance, good gloss and good mechanical properties such as hardness, mar resistance and elasticity. Not least among the requirements, the transparent topcoat obtained after the drying process must have a high resistance to climatic effects (e.g. fluctuations in temperature, moisture in the form of water vapor, rain and dew, radiation-induced stress, etc.) and to attacks by acids or other chemicals such as, for example, organic solvents.

JP-A-1-158079 describes nonaqueous transparent topcoats for two-coat finishes of the basecoat/clearcoat type, which contain a hydroxyl group-containing polyacrylate resin which is obtainable by polymerizing from 10 to 50% by weight of an adduct of a cyclic ester, for example ε-caprolactone with hydroxyethyl acrylate or methacrylate, from 0 to 40% by weight of a hydroxyalkyl acrylate or methacrylate and from 30 to 80% by weight of a copolymerizable vinyl monomer to give a polyacrylate resin having a hydroxyl number of from 60 to 160, an acid number of from 0 to 40 and a glass transition temperature of from −50 to +40° C. The transparent topcoats described in JP-A-1-158079 give finishes which are in need of improvement, especially with respect to their acid resistance and adhesion.

JP-A-4-1254 discloses coating compositions which contain, in addition to a crosslinking agent, a hydroxyl group-containing polyacrylate resin which has been prepared using 4-t-butylcyclohexyl acrylate and/or 4-t-butylcyclohexyl methacrylate as monomer component. The hydroxyl group-containing monomer employed for the preparation of the polyacrylate resin comprises, in particular, hydroxyethyl acrylate and hydroxyethyl methacrylate. These coating compositions known from JP-A-4-1254 have the particular disadvantage, when used as a transparent topcoat over a basecoat, that the resulting coatings are of inadequate adhesion to the basecoat. Furthermore, the resulting coatings have a poor solvent resistance, a high swellability and a poor overcoatability.

Finally, German Patent Application P 43 10 414.2, which is not a prior publication, describes coating compositions of the type described initially which contain as binder a hydroxyl group-containing polyacrylate resin which has been prepared using 4-hydroxy-n-butyl acrylate and/or 4-hyroxy-n-butyl methacrylate as monomer component. The coating compositions described therein are employed in particular in the sector of automotive production-line finishing. Coating compositions for the sector of automotive refinishing are not described in this application.

The object of the present invention was therefore to provide coating compositions which, when used as transparent topcoat over a basecoat, lead to coatings whose mar resistance is improved relative to known coating compositions. In addition, the resulting coatings should have in particular a good adhesion to the basecoat and, furthermore, a high degree of hardness coupled with good elasticity, a very good topcoat appearance, a high degree of transparency and good gloss. In addition, the resulting coatings should possess good polishability and good weathering resistance. Finally, the coating compositions should be readily processable and should be suitable for automotive refinishing; that is, they should be able to cure fully at low temperatures of in general below 120° C., preferably below 80° C. Even at these low temperatures the coating compositions should reach full cure rapidly (in particular, should display rapid through-drying) while nevertheless remaining processable (pot life) for as long as possible.

Surprisingly, this object is achieved by a coating composition of the type described initially, which is characterized in that 1.) component (A) is a hydroxyl group-containing polyacrylate resin which is obtainable by polymerizing
   (a) from 10 to 51% by weight of a mixture comprising
      (a1) one or more monomers selected from the group consisting of 4-hydroxy-n-butyl acrylate and/or 4-hyroxy-n-butyl methacrylate and/or 3-hydroxy-n-butyl acrylate and/or 3-hydroxy-n-butyl methacrylate, and
      (a2) one or more monomers selected from the group consisting of 3-hydroxy-n-propyl acrylate and/or 3-hydroxy-n-propyl methacrylate and/or 2-hydroxy-n-propyl acrylate and/or 2-hydroxy-n-propyl methacrylate,
   (b) from 0 to 20% by weight of a hydroxyl group-containing ester of acrylic acid or of methacrylic acid which is different from (a) and has at least 5 carbon atoms in the alcohol residue and/or of a hydroxyl group-containing ester of a polymerizable ethylenically unsaturated carboxylic acid, which is different from (a), or of a mixture of such monomers, (c) from 28 to 85% by weight of an aliphatic or cycloaliphatic ester of acrylic acid or of methacrylic acid which is different from (a) and (b) and has at least 4 carbon atoms in the alcohol residue, or of a mixture of such monomers, (d) from 0 to 25% by weight of an aromatic vinyl hydrocarbon which is different from (a), (b) and (c), or of a mixture of such monomers, (e) from 0 to 5% by weight of an ethylenically unsaturated carboxylic acid, or of a mixture of ethylenically unsaturated carboxylic acids, and (f) from 0 to 20% by weight of an ethylenically unsaturated monomer which is different from (a), (b), (c), (d) and (e), or of a mixture of such monomers to give a polyacrylate resin having a hydroxyl number of from 60 to 200 mg of KOH/g, an acid number of from 0 to 35 mg of KOH/g and a number-average molecular weight of from 1000 to 5000, the sum of the proportions by weight of components (a) to (f) being in each case 100% by weight, and 2.) component (B) is a mixture comprising (B1) at least one polymer of an aliphatic and/or cycloaliphatic and/or of an araliphatic di- and/or polyisocyanate having an average functionality of from 3 to 4 and having a uretdione group content of not more than 5%, (B2) optionally at least one polymer of an aliphatic and/or cycloaliphatic and/or of an araliphatic di- and/or polyisocyanate having an average functionality of from 2 to 3 and having a uretdione group content of from 20 to 40%, and (B3) optionally at least one aliphatic and/or cycloaliphatic and/or araliphatic di- or polyisocyanate which is different from (B1) and (B2).

The present invention also relates to a process for producing a multilayer coating on a substrate surface, using these coating compositions, and to the use of the coating compositions in the sector of automotive refinishing.

It is surprising and was not foreseeable that the coating compositions according to the invention, when used as transparent topcoat over a basecoat, would be notable for very good mar resistance and very good adhesion to the basecoat. A further advantage is that the coating compositions lead to coatings having a high degree of hardness coupled with good elasticity, very good topcoat appearance, a high degree of transparency, good gloss, good polishability and high resistance to climatic effects (such as, for example, fluctuations in temperature, moisture in the form of water vapor, rain and dew, radiation-induced stress, etc.). Furthermore, the coating compositions have the advantage that they are readily processable and can be cured fully at low temperatures and can therefore be employed in the sector of automotive refinishing. Even when the coating compositions are cured at low temperatures, the coating compositions rapidly reach full cure while nevertheless remaining processable for a long time (pot life).

DETAILED DESCRIPTION

The text below now describes the individual constituents of the coating composition according to the invention in more detail. The acrylate resin (A) which is employed in accordance with the invention is obtainable by polymerizing (a) from 10 to 51% by weight, preferably from 10 to 35% by weight, of a mixture comprising (a1) one or more monomers selected from the group consisting of 4-hydroxy-n-butyl acrylate and/or 4-hyroxy-n-butyl methacrylate and/or 3-hydroxy-n-butyl acrylate and/or 3-hydroxy-n-butyl methacrylate, and (a2) one or more monomers selected from the group consisting of 3-hydroxy-n-propyl acrylate and/or 3-hydroxy-n-propyl methacrylate and/or 2-hydroxy-n-propyl acrylate and/or 2-hydroxy-n-propyl methacrylate, (b) from 0 to 20% by weight, preferably from 0 to 10% by weight, of a hydroxyl group-containing ester of acrylic acid or of methacrylic acid which is different from (a) and has at least 5 carbon atoms in the alcohol residue and/or of a hydroxyl group-containing ester of a polymerizable ethylenically unsaturated carboxylic acid, which is different from (a), or of a mixture of such monomers, (c) from 28 to 85% by weight, preferably from 40 to 70% by weight, of an aliphatic or cycloaliphatic ester of acrylic acid or of methacrylic acid which is different from (a) and (b) and has at least 4 carbon atoms in the alcohol residue, or of a mixture of such monomers, (d) from 0 to 25% by weight, preferably from 5 to 20% by weight, of an aromatic vinyl hydrocarbon which is different from (a), (b) and (c), or of a mixture of such monomers, (e) from 0 to 5% by weight, preferably from 1 to 3% by weight, of an ethylenically unsaturated carboxylic acid, or of a mixture of ethylenically unsaturated carboxylic acids, and (f) from 0 to 20% by weight, preferably from 0 to 15% by weight, of an ethylenically unsaturated monomer which is different from (a), (b), (c), (d) and (e), or of a mixture of such monomers to give a polyacrylate resin having a hydroxyl number of from 60 to 200, preferably from 80 to 160, mg of KOH/g, an acid number of from 0 to 35, preferably from 0 to 25, mg of KOH/g and a number-average molecular weight of from 1000 to 5000, preferably from 1800 to 3500, the sum of the proportions by weight of components (a) to (f) being in each case 100% by weight.

The polyacrylate resins which are employed in accordance with the invention can be prepared by generally well-known methods of polymerization. Polymerization methods for the preparation of polyacrylate resins are generally known and are described in numerous references (cf. e.g.: Houben-Weyl, Methoden der organischen Chemie [Methods of organic chemistry], 4th edition, volume 14/1, pages 24 to 255 (1961)).

The polyacrylate resins which were employed in accordance with the invention are preferably prepared with the aid of the solution polymerization method. In this method, commonly, an organic solvent or solvent mixture is initially introduced and is heated to boiling. The monomer mixture to be polymerized, along with one or more polymerization initiators, are then added continuously to this organic solvent or solvent mixture. Polymerization is carried out at temperatures of between 100 and 160° C., preferably between 130 and 150° C. The polymerization initiators employed are preferably initiators which form free radicals. The nature and quantity of the initiator are commonly chosen such that, at the polymerization temperature during the feed phase, the supply of radicals remains as constant as possible.

Examples of initiators which can be employed are: di-tert-butyl peroxide, tert-butyl hydroperoxide, tert-butyl peroxybenzoate, tert-butyl peroxypivalate, tert-butyl peroxy-3,5,5-trimethylhexanate, tert-butyl peroxy-2- ethylhexanoate, dicumyl peroxide, cumyl hydroperoxide, tert-amyl peroxybenzoate, tert-amyl peroxy-2-ethylhexanoate, diacyl peroxides, for example diacetyl peroxide, peroxyketals, 2,2-di(tert-amylperoxy)propane, ethyl 3,3-di(tert-amylperoxy)butyrate and thermally labile, highly substituted ethane derivatives, for example those based on silyl-substituted ethane derivatives and based on benzopinacol. In addition, aliphatic azo compounds such as, for example, azoisovaleronitrile and azobiscyclohexanenitrile can also be employed. The quantity of initiator is in most cases from 0.1 to 8% by weight, based on the quantity of monomer to be processed, but may also be higher if desired. The initiator, dissolved in a portion of the solvent employed for the polymerization, is metered in gradually during the polymerization reaction. The initiator feed preferably lasts from about 0.5 to 2 hours longer than the monomer feed, so as to achieve a good action even during the after polymerization phase. If initiators having only a low decomposition rate under the prevailing reaction conditions are employed, then it is also possible to include the initiator in the initial charge.

The polymerization conditions (reaction temperature, feed time of the monomer mixture, nature and quantity of the organic solvents and polymerization initiators, possible use of molecular weight regulators, for example mercaptans, thioglycolic esters and hydrogen chlorides) are chosen such that the polyacrylate resins which are employed in accordance with the invention have a number-average molecular weight of from 1000 to 5000, preferably from 1800 to 3500 (determined by gel permeation chromatography using polystyrene as calibrating material).

The acid number of the polyacrylate resins which are employed in accordance with the invention can be adjusted by the person skilled in the art by using appropriate quantities of component (e). Similar comments apply to the adjustment of the hydroxyl number. It can be controlled by way of the quantity of component (a) and (b) which is employed.

It is essential to the invention that the mixture employed as component (a) comprises (a1) one or more monomers selected from the group consisting of 4-hydroxy-n-butyl acrylate and/or 4-hydroxy-n-butyl methacrylate and/or 3-hydroxy-n-butyl acrylate and/or 3-hydroxy-n-butyl methacrylate, and (a2) one or more monomers selected from the group consisting of 3-hydroxy-n-propyl acrylate and/or 3-hydroxy-n-propyl methacrylate and/or 2-hydroxy-n-propyl acrylate and/or 2-hydroxy-n-propyl methacrylate.

The mixture preferably employed as component (a) comprises (a1) from 10 to 85% by weight, preferably from 20 to 65% by weight, of component (a1), and (a2) from 15 to 90% by weight, preferably from 35 to 80% by weight, of component (a2), the sum of the proportions by weight of components (a1) and (a2) being in each case 100% by weight.

The composition of component (a) is preferably chosen such that the product of the polymerization of component (a) alone is a polyacrylate resin having a glass transition temperature of from −62° C. to +65° C., preferably from −50° C. to +35° C.

The glass transition temperature can be calculated approximately by the person skilled in the art with the aid of the formula $$\frac{1}{T_G} = \sum_{n=1}^{n=x} \frac{W_n}{T_{Gn}}$$

$T_G$=glass transition temperature of the polymer
x=number of different monomers incorporated by polymerization
$W_n$=proportion by weight of the nth monomer
$T_{Gn}$=glass transition temperature of the homopolymer of the nth monomer.

The mixture which is employed in particular as component a) comprises (a1) 4-hydroxy-n-butyl acrylate and/or 3-hydroxy-n-butyl acrylate, and (a2) 3-hydroxy-n-propyl methacrylate and/or 2-hydroxy-n-propyl methacrylate.

As a further hydroxyl group-containing monomer (component (b)) it is possible if desired, for the preparation of the acrylate resin, to employ further hydroxyl group-containing esters of acrylic acid and/or methacrylic acid, in which the alcohol residue contains at least 5 carbon atoms. Examples of hydroxyl group-containing monomers which are suitable as component (b) are, in particular, the reaction product of 1 mol of hydroxyethyl acrylate and/or hydroxyethyl methacrylate with on average 2 mol of ε-caprolactone and/or the reaction product of acrylic acid and/or methacrylic acid with the glycidyl ester of a carboxylic acid having a tertiary α carbon atom. These glycidyl esters of carboxylic acids which have from 11 to 13 carbon atoms and are branched on the α carbon atom (Versatic acid) are commercially available, for example, under the name Cardura® from Shell. The reaction of the acrylic and/or methacrylic acid with the glycidyl ester can in this context be carried out before, during or after the polymerization.

However, as component (b) it is also possible to employ alkyl esters of acrylic acid and/or methacrylic acid, for example hydroxypentyl acrylates and methacrylates, hydroxyhexyl acrylates and methacrylates, hydroxyoctyl acrylates and methacrylates, etc., and/or hydroxyl group-containing esters of a polymerizable ethylenically unsaturated carboxylic acid which are different from (a), for example the hydroxyl group-containing esters of crotonic and isocrotonic acid.

As component (c) it is possible in principle to employ any aliphatic or cycloaliphatic esters of acrylic acid or of methacrylic acid which have at least 4 carbon atoms in the alcohol residue and are different from (a) and (b), or a mixture of such monomers. Examples are: aliphatic esters of acrylic acid and of methacrylic acid, having 4 to 20 carbon atoms in the alcohol residue, for example n-butyl, isobutyl, tert-butyl, n-hexyl, 2-ethylhexyl, stearyl and lauryl acrylate and methacrylates, and cycloaliphatic esters of (meth)acrylic acid, for example furfuryl, cyclohexyl, isobornyl, and t-butylcyclohexyl acrylate and methacrylate.

The composition of component (c) is preferably chosen such that the polymerization of component (c) alone produces a polymethacrylate resin having a glass transition temperature of from −30 to +100° C., preferably from −10 to +90° C.

As component (d), aromatic vinyl hydrocarbons are employed, such as styrene, α-alkylstyrenes such as α-methylstyrenes, chlorostyrenes, o-, m- and p-methylstyrene, 2,5-dimethylstyrene, p-methoxystyrene, p-tert-butylstyrene, p-dimethylaminostyrene, p-acetamido styrene and vinyltoluene, with vinyltoluenes and, in particular, styrene being preferably employed.

As component (e) it is possible in principle to employ any ethylenically unsaturated carboxylic acid or a mixture of ethylenically unsaturated carboxylic acids. As component (e) it is preferred to employ acrylic acid and/or methacrylic acid.

As component (f) it is possible in principle to employ any ethylenically unsaturated monomer which is different from (a), (b), (c), (d) and (e), or a mixture of such monomers. Examples of monomers which can be employed as component (f) are: amides of acrylic acid and methacrylic acid, for example methacrylamide and acrylamide; nitriles of methacrylic acid and acrylic acid; vinyl ethers and vinyl esters.

The composition of component (e) is preferably chosen such that the polymerization of component (e) alone produces a polymer having a glass transition temperature of from +70 to +185° C., preferably from +80 to +120° C.

It is also essential to the invention that the coating compositions according to the invention contain as crosslinking agent (B) a mixture comprising (B1) at least one polymer of an aliphatic and/or cycloaliphatic and/or of an araliphatic di- and/or polyisocyanate having an average functionality of from 3 to 4 and having a uretdione group content of not more than 5%, (B2) optionally at least one polymer of an aliphatic and/or cycloaliphatic and/or of an araliphatic di- and/or polyisocyanate having an average functionality of from 2 to 3 and having a uretdione group content of from 20 to 40%, and (B3) optionally at least one aliphatic and/or cycloaliphatic and/or araliphatic di- or poly isocyanate which is different from (B1) and (B2).

The coating compositions preferably contain as crosslinking agent (B) a mixture comprising (B1) from 40 to 100% by weight of component (B1), (B2) from 0 to 60% by weight of component (B2), and (B3) from 0 to 25% by weight of component (B3), the sum of the proportions by weight of components (B1) to (B3) being in each case 100% by weight and the proportions by weight being based in each case on the solids content.

Furthermore, the composition of the curing component (B) is with particular preference tailored to the composition of the acrylate resin (A):

If the acrylate resin (A) has been prepared using more than 14% by weight, based on the overall weight of the monomers (a) to (f) employed, of hydroxyl group-containing monomers which are different from (a1) (ie. monomers selected from the group consisting of hydroxypropyl methacrylate and/or hydroxypropyl acrylate and/or component (b)), then the mixture employed as component (B) preferably comprises (B1) from 45 to 89% by weight of component (B1), (B2) from 11 to 55% by weight of component (B2), and (B3) from 0 to 10% by weight of component (B3).

If the acrylate resin (A) has been prepared using not more than 14% by weight, based on the overall weight of the monomers (a) to (f) employed, of hydroxyl group-containing monomers which are different from (a1) (ie. monomers selected from the group consisting of hydroxypropyl methacrylate and/or hydroxypropyl acrylate and/or component (b)), then the mixture employed as component (B) preferably comprises (B1) from 45 to 100% by weight of component (B1), (B2) from 0 to 55% by weight of component (B2), and (B3) from 0 to 10% by weight of component (B3).

In the coating compositions according to the invention, it is preferred to employ as component (B1) and (B2) polymers based on 3,5,5-trimethyl-1-isocyanato-3-isocyanatomethylcyclohexane and, in particular, polymers based on hexamethylene diisocyanate.

Examples of isocyanate compounds which are suitable as component (B1) are the products which are available commercially under the following names:

Desmodur® N 3390 from Bayer AG, a 90% strength solution of a trimer based on hexamethylene diisocyanate, having a number-average molecular weight of about 700, an average functionality of between 3 and 4 and a uretdione content of not more than 5%;

Tolonate® HD T90 from Rhône Poulenc, a polymer based on hexamethylene diisocyanate, having an average functionality of between 3 and 4, a uretdione group content of not more than 5.0% by weight and a solids content of 90%.

One example of an isocyanate compound which is suitable as component (B2) is the product which is commercially available under the following name:

Desmodur® N 3400 from Bayer AG, a trimer based on hexamethylene diisocyanate, having a number-average molecular weight of about 500, an average functionality between 2 and 3 and a uretdione group content of between 30 and 40%.

One example of an isocyanate compound which is suitable as component (B3) is the product which is commercially available under the following name:

Desmodur® Z 4370 from Bayer AG, a 70% strength solution of a polyisocyanate based on an isophorone diisocyanate trimer, having an average functionality of from 2.9 to 3.7.

In addition, the following polyisocyanates may be employed as component (B3):

cycloaliphatic isocyanates, for example 1,3-cyclopentane, 1,4-cyclohexane, 1,2-cyclohexane and isophorone diisocyanate, aliphatic isocyanates such as trimethylene, tetramethylene, pentamethylene, hexamethylene and trimethylhexamethylene 1,6-diisocyanate, and tris-hexamethylene triisocyanate.

Preference is given to employing diisocyanates having isocyanate groups of different reactivity, for example isophorone diisocyanate.

The quantity of the crosslinking agent employed is chosen such that the ratio of the isocyanate groups of the crosslinking agent to the hydroxyl groups of component (A) is in the range from 1:3 to 3:1. The coating compositions according to the invention usually contain from 15 to 45% by weight of the acrylate resin (A) and from 6 to 20% by weight of the crosslinking agent (B), based in each case on the overall weight of the coating composition and based on the solids content of components (A) and (B).

The coating compositions according to the invention may additionally contain, if desired, one or more other hydroxyl group-containing resins, whereby, for example, the solvent resistance and hardness of the resulting coating are improved further. For example, they may contain further hydroxyl group-containing acrylate resins, which are different from the above-described acrylate resin (A), and/or polycondensation resins (especially polyesters).

These further binders are usually employed in a quantity of from 0 to 25% by weight, based in each case on the overall weight of the coating composition and based on the solids content of the binder.

Examples of suitable additional binders are, for example, the polyacrylate resins which are commercially available under the name Macrynal® SM 510 and SM 513 from Hoechst, and the hydroxyl group-containing polyacrylate resins which are described in German Patent Application DE-A-40 24 204 and are prepared in the presence of a polyester. For details reference is made to DE-A-40 24 204, especially page 3, line 18 to page 7, line 53.

Also suitable are hydroxyl group-containing polyacrylate resins which are obtainable by polymerizing ($m_1$) from 5 to 80% by weight, preferably from 5 to 30% by weight, of a cycloaliphatic ester of methacrylic acid and/or acrylic acid, or of a mixture of such monomers, ($m_2$) from 10 to 50% by weight, preferably from 15 to 40% by weight, of a hydroxyl group-containing alkyl ester of methacrylic acid and/or acrylic acid, or of a mixture of such monomers, ($m_3$) from 0 to 25% by weight, preferably from 0to 15% by weight, of a hydroxyl group-containing ethylenically unsaturated monomer which is different from ($m_1$) and ($m_2$), or of a mixture of such monomers, ($m_4$) from 5 to 80% by weight, preferably from 5 to 30% by weight, of an aliphatic ester of methacrylic and/or acrylic acid, which is different from ($m_1$), ($m_2$) and ($m_3$), or of a mixture of such monomers, ($m_5$) from 0 to 40% by weight, preferably from 10 to 30% by weight, of an aromatic vinyl hydrocarbon which is different from ($m_1$), ($m_2$), ($m_3$) and ($m_4$), or of a mixture of such monomers, and ($m_6$) from 0 to 40% by weight, preferably from 0 to 30% by weight, of a further ethylenically unsaturated monomer which is different from ($m_1$), ($m_2$), ($m_3$), ($m_4$) and ($m_5$), or of a mixture of such monomers, to give a polyacrylate resin having a number-average molecular weight Mn of from 1000 to 5000, a ratio of weight-average molecular weight Mw to number-average molecular weight Mn of less than 5.0, preferably from 1.8 to 4.0, and an OH number of from 60 to 180, preferably from 100 to 150, mg of KOH/g, the sum of the proportions by weight of components ($m_1$) to ($m_6$) always being 100% by weight, and where, as component ($m_2$), only monomers or mixtures of monomers are employed which on polymerization of the particular monomer alone produce a polyacrylate and/or polymethacrylate resin having a glass transition temperature of from −10° C. to +6° C. or from +60° C. to 80° C.

As component ($m_2$) it is preferred to employ 3-hydroxypropyl methacrylate and/or 2-hydroxypropyl methacrylate and/or 3-hydroxypropyl acrylate and/or 2-hydroxypropyl acrylate. Examples of the monomers which are suitable as components ($m_1$) and ($m_3$) to ($m_6$) are the monomers described in the course of the description of the acrylate resin (A) which is employed in accordance with the invention.

The coating compositions according to the invention additionally contain one or more organic solvents. These solvents are commonly employed in quantities of from 20 to 70% by weight, preferably from 25 to 65% by weight, based in each case on the overall weight of the coating composition. Examples of suitable solvents are relatively highly substituted aromatic substances, for example solvent naphtha, heavy benzole, various Solvesso® grades, various Shellsol® grades and Deasol®, and relatively high-boiling aliphatic and cycloaliphatic hydrocarbons, for example various white spirits, mineral terpentine oil, tetralin and decalin and various esters, for example ethylglycol acetate, butylglycol acetate, ethyldiglycol acetate and the like.

The coating compositions according to the invention may additionally contain conventional auxiliaries and additives in conventional quantities, preferably from 0.01 to 10% by weight based on the overall weight of the coating composition. Examples of suitable auxiliaries and additives are leveling agents such as silicone oils, plasticizers such as phosphates and phthalates, viscosity-controlling additives, matting agents, UV absorbers, light stabilizers and, if desired, fillers.

The coating compositions are prepared in a known manner by mixing and, if desired, dispersing the individual components.

These coating compositions can be applied to a substrate in the form of a film by spraying, flow coating, dipping, rolling, knife-coating or brushing, the film subsequently being cured to give a firmly adhering coating.

These coating compositions are commonly cured at room temperature or slightly elevated temperature, preferably at slightly elevated temperature, advantageously at temperatures of below 120° C., preferably at temperatures below 80° C. and preferably at temperatures of about 60° C. However, the coating compositions may also be cured under baking conditions, i.e. at temperatures of at least 120° C. In this case, however, it should be ensured that the crosslinking component does not contain any polyisocyanates (B2).

Suitable substrates are, in particular, metals and also wood, plastic, glass and the like.

Owing to the short curing times and low curing temperatures, the coating compositions according to the invention are preferably used for automotive refinishing, the finishing of large vehicles and goods vehicle bodies. However, depending on the crosslinking agent employed, they can also be utilized for the production-line finishing of motor vehicles. Furthermore, they are particularly suitable as a clearcoat.

The present invention therefore also relates to a process for producing a multicoat protective and/or decorative finish on a substrate surface, in which (1) a pigmented basecoat is applied to the substrate surface, (2) a polymer film is formed from the basecoat applied in step (1), (3) a transparent topcoat containing
   (A) a hydroxyl group-containing polyacrylate resin and
   (B) a crosslinking agent is applied to the resulting basecoat, and subsequently (4) basecoat and topcoat are cured together, characterized in that the topcoat employed is the coating composition according to the invention.

The basecoats employed in this process are known and therefore require no further description. Examples of suitable basecoats include the basecoats described in DE-A 41 10 520, DE-A 40 09 000, DE-A 40 24 204, EP-A-355433, DE-A 35 45 618, DE-A 38 13 866 and in German Patent Application P 42 32 717.2, which is not a prior publication.

Also suitable are the basecoats described in German Patent Application P 43 27 416.1, which has not yet been published, which are characterized in that they contain a hydroxyl group-containing polyester having a weight-average molecular weight Mw of 40,000–200,000 and a polydispersity Mw/Mn>8, and in that at least 50% by weight of aromatic dicarboxylic acids or esterifiable derivatives thereof have been employed for the preparation of the polyester, but where the content of phthalic anhydride is not more than 80% by weight and the percentages by weight are based in each case on the overall weight of the acid components employed in the preparation of the polyester.

The coating compositions according to the invention can also be used for application over oxidatively drying, pigmented oxidatively drying and pigmented 2-component polyurethane coating materials which are conventionally employed in the sector of optionally one-coat automotive refinishing. In this case too, coatings having the desired advantageous properties are obtained.

The coating compositions according to the invention are particularly notable for good adhesion to the basecoat, good mar resistance and a high degree of hardness of the resulting coatings. In addition, the coating compositions exhibit rapid drying coupled with prolonged processability (long pot life). In addition, the resulting coatings, especially in the case of clearcoats, display good mechanical properties such as, for example, good gloss retention, good fullness, good leveling and a good topcoat appearance.

The invention is now illustrated in more detail with reference to embodiment examples. All parts and percentages in these examples are by weight unless expressly stated otherwise.

I. Preparation of the Hydroxyl Group-containing Acrylate Resins E1 to E4 and V1 to V2

The monomers employed for the preparation of the hydroxyl group-containing acrylate resins are compiled in Table 1. The number-average and weight-average molecular weights were determined by GPC measurements against a polystyrene standard. The hydroxy-n-propyl methacrylate employed represented a commercial mixture of 25% by weight of 3-hydroxy-n-propyl methacrylate and 75% by weight of 2-hydroxy-n-propyl methacrylate. The properties of the resulting acrylate resins are shown in Table 2.

I.1. Preparation of the Hydroxyl Group-containing Acrylate Resin E1

1164 g of Solventnaphtha® (aromatic solvent mixture having a boiling range of from 160 to 185° C.) were initially introduced into a 4l reactor which is suitable for polymerization reactions, and were heated under nitrogen with stirring at 140° C. A monomer mixture of 180 g of styrene, 1121.4 g of butyl methacrylate, 180 g of hydroxypropyl methacrylate, 280.8 g of 4-hydroxybutyl acrylate and 31.8 g of acrylic acid was metered over the course of 4 h, and a mixture of 108 g of tert-butyl peroxyethylhexanoate and 108 g of Solventnaphtha® over a period of 4.75 h, into this initial charge, at a uniform rate and beginning simultaneously. After the end of the initiator feed, the batch was after polymerized for 2 h. The finished polyacrylate resin has a solids content of 57.6% (130° C. 1 h), an acid number of 17.3 and an original viscosity of 7.0 dPa.s (Mn=2192; Mw=5740).

I.2. Preparation of the Hydroxyl Group-containing Acrylate Resin E2

1164 g of Solventnaphtha® were initially introduced into a 4 1 reactor which is suitable for polymerization reactions, and were heated under nitrogen with stirring at 140° C. A monomer mixture of 180 g of styrene, 1121.4 g of butyl methacrylate, 360 g of hydroxypropyl methacrylate, 100.8 g of 4-hydroxybutyl acrylate and 37.8 g of acrylic acid was metered over the course of 4 h, and a mixture of 108 g of tert-butyl peroxyethylhexanoate and 108 g of Solventnaphtha® over a period of 4.75 h, into this initial charge, at a uniform rate and beginning simultaneously. After the end of the initiator feed, the batch was after polymerized for 2 h. The finished polyacrylate resin has a solids content of 57.6% (130° C. 1 h), an acid number of 17.6 and an original viscosit849 y of 12.8 dPa.s (Mn=2166; Mw=6115).

I.3. Preparation of the Hydroxyl Group-containing Acrylate Resin E3

1164 g of Solventnaphtha® were initially introduced into a 1 l reactor which is suitable for polymerization reactions, and were heated under nitrogen with stirring at 140° C. A monomer mixture of 180 g of styrene, 1121.4 g of butyl methacrylate, 270 g of hydroxypropyl methacrylate, 191 g of 4-hydroxybutyl acrylate and 37.8 g of acrylic acid was metered over the course of 4 h, and a mixture of 108 g of tert-butyl peroxyethylhexanoate and 108 g of Solventnaphtha® over a period of 4.75 h, into this initial charge, at a uniform rate and beginning simultaneously. After the end of the initiator feed, the batch was after polymerized for 2 h. The finished polyacrylate resin has a solids content of 57.6% (130° C. 1 h), an acid number of 17.6 and an original viscosity of 7.8 dPa.s (Mn=2150; Mw=5900).

I.4 Preparation of the Hydroxyl Group-containing Acrylate Resin V1

1003 g of Solventnaphtha® were initially introduced into a 1 l reactor which is suitable for polymerization reactions, and were heated under nitrogen with stirring at 140° C. A monomer mixture of 180 g of styrene, 1121.4 g of butyl methacrylate, 460.8 g of hydroxypropyl acrylate, and 37.8 g of acrylic acid was metered over the course of 4 h, and a mixture of 108 g of tert-butyl peroxyethylhexanoate and 108 g of Solventnaphtha® over a period of 4.75 h, into this initial charge, at a uniform rate and beginning simultaneously. After the end of the initiator feed, the batch was after polymerized for 2 h. The finished polyacrylate resin has a solids content of 59.1% (130° C. 1 h), an acid number of 16.5 and an original viscosity of 6.6 dPa.s (Mn=2241; Mw=7211).

I.5 Preparation of the Hydroxyl Group-containing Acrylate Resin V2

1358 g of Solventnaphtha® were initially introduced into a 4l reactor which is suitable for polymerization reactions, and were heated under nitrogen with stirring at 140° C. A monomer mixture of 210 g of styrene, 1308 g of butyl methacrylate, 538 g of hydroxypropyl methacrylate, and 44 g of acrylic acid was metered over the course of 4 h, and a mixture of 126 g of tert-butyl peroxyethylhexanoate and 126 g of Solventnaphtha® over a period of 4.75 h, into this initial charge, at a uniform rate and beginning simultaneously. After the end of the initiator feed, the batch was after-polymerized for 2 h. The finished polyacrylate resin has a solids content of 56.2% (130° C. 1 h), an acid number of 18.7 and an original viscosity of 22.5 dPa.s (Mn=2346; Mw=8856).

I.6. Preparation of the Hydroxyl Group-containing Acrylate Resin E4

1164 g of Solventnaphtha® were initially introduced into a 4l reactor which is suitable for polymerization reactions, and were heated under nitrogen with stirring at 140° C. A monomer mixture of 180 g of tert-butylcyclohexyl acrylate, 1121 g of butyl methacrylate, 360 g of hydroxypropyl methacrylate, 101 g of hydroxy-butyl acrylate and 38 g of acrylic acid was metered over the course of 4 h, and a mixture of 108 g of tert-butyl peroxyethylhexanoate and 108 g of Solventnaphtha® over a period of 4.75 h, into this initial charge, at a uniform rate and beginning simultaneously. After the end of the initiator feed, the batch was after-polymerized for 2 h. The finished polyacrylate resin has a solids content of 56.3% (130° C. 1 h), an acid number of 17.6 and an original viscosity of 5.3 dPa.s (Mn=1909; Mw=4963).

II. Preparation of the Coating Compositions E1 to E4 and V1 to V2 (Comparison Examples)

II.1. Preparation of the Curing Solutions 1 to 4

The curing solutions are prepared from the components indicated below by mixing:

| Curing agent | E1 | E2 | E3 | E4 |
|---|---|---|---|---|
| Butyl acetate 98% | 49.0 | 49.0 | 49.0 | 44.5 |
| Butylglycol acetate | 6.0 | 6.0 | 6.0 | 6.0 |
| Catalyst solution[1] | 1.5 | 1.5 | 1.5 | 1.5 |
| Desmodur ® N 3400[2] | 19.5 | 10.0 | 5.0 | — |
| Desmodur ® N 3390[3] | 24.0 | 33.5 | 38.5 | 48 |
| Solids content (%) | 41 | 40 | 40 | 44 |

[1] Catalyst solution described in section II.3.
[2] Commercial water-thinnable polyisocyanate from Bayer AG based on a hexamethylene diisocyanate dimer/trimer, having a number-average molecular weight of about 500, an average functionality of between 2 and 3 and a uretdione group content of between 30 and 40%.
[3] Commercial polyisocyanate from Bayer AG, a 90% strength solution in 1:1 butyl acetate/solvent naphtha of a trimer based on hexamethylene diisocyanate, having a number-average molecular weight of about 700, an average functionality of between 3 and 4 and a uretdione group content of not more than 5%.

II.2. Preparation of an Adjustment Additive

An adjustment additive is prepared from the components indicated below by mixing:

| | |
|---|---|
| xylene | 20.0 |
| Solvent naphta ® | 15.0 |
| Benzine 135/180 | 10.0 |
| Butylglycol acetate | 5.0 |
| Butyl acetate | 50.0 |

II.3. Preparation of a Catalyst Solution 1.0 parts of dibutyltin dilaurate is mixed with 99.0 parts of butyl acetate 98/100.

II.4. Preparation of a Leveling Agent Solution 5.0 parts of a commercial leveling agent based on a polyether-modified methylpolysiloxane (commercial product Baysilone OL 44 from Bayer AG) and 95.0 parts of xylene are mixed.

II.5. Preparation of the Clearcoat Solutions E1 to E4 and V1 to V2

The clearcoat solutions are prepared from the components indicated in Table 3 by mixing.

II.6. Preparation of the Transparent Topcoats E1 to E4 and V1 to V2 (Comparison Examples)

The transparent topcoats are prepared by mixing in each case 100 parts by volume of the clearcoat solutions E1 to E4 or V1 to V2, respectively, with 50 parts by volume of the above-described curing solutions E1 to E4 and 30 parts by volume of the above-described adjustment additive. The composition of the topcoats is shown in Tables 4 to 8.

The coating material obtained in this way is then applied to phosphatized and coated steel panels. To this end the phosphatized steel panels are coated with a commercial conventional filler (commercial product Glasurit Grundfüller [primer surfacer] 801-1552 from Glasurit GmbH, Münster) with a binder based on an epoxide group-containing binder and with an amino-functional curing agent, dried at 80° C. for 20 min and at room temperature for 24 h and then coated with a commercial conventional metallic basecoat (commercial product Basislack [basecoat] 54 A 926 from Glasurit GmbH, Münster) based on a hydroxyl group-containing polyester, cellulose acetobutyrate, wax and a melamine resin. After a flash-off time of 30 min the clearcoat is applied. The panels are then dried at 60° C. for 30 min and at room temperature for 16 h.

The results from the testing of the resulting coatings are given in Tables 4 to 8.

TABLE 1

Composition of the acrylate resins in % by weight

| | E1 | V1 | V2 | E2 | E3 | E4 |
|---|---|---|---|---|---|---|
| Styrene | 10 | 10 | 10 | 10 | 10 | — |
| t-Butylcyclohexyl acrylate | — | — | — | — | — | 10 |
| n-Butyl methacrylate | 62.3 | 62.3 | 62.3 | 62.3 | 62.3 | 62.3 |
| 4-Hydroxy-n-butyl acrylate | 15.6 | 25.6 | — | 5.6 | 10.6 | 15.6 |
| 3-Hydroxy-n-propyl methacrylate | 10.0 | — | 25.6 | 20.0 | 15.0 | 10 |
| Acrylic acid | 2.1 | 2.1 | 2.1 | 2.1 | 2.1 | 2.1 |

TABLE 2

Properties of the acrylate resins

| | E1 | V1 | V2 | E2 | E3 | E4 |
|---|---|---|---|---|---|---|
| OH number [mg of KOH/g] | 100 | 100 | 100 | 100 | 100 | 100 |
| Acid number [mg of KOH/g] | 17.3 | 16.5 | 18.7 | 17.6 | 17.6 | 17.6 |
| $M_n$ | 2192 | 2241 | 2346 | 2166 | 2150 | 1909 |
| $M_w$ | 5740 | 7211 | 8856 | 6115 | 5900 | 4963 |
| $M_n/M_w$ | 2.6 | 3.2 | 3.8 | 2.8 | 2.7 | 2.6 |
| Tg (°C.) | +13.6 | −1.3 | +40.5 | +30.3 | +21.7 | +28.4 |
| Tg (c) (°C.) | 20 | 20 | 20 | 20 | 20 | +26.0 |
| Tg (a) (°C.) | −26.6 | −65 | +73 | +29.1 | −1.6 | +29.1 |
| η [dpas.s] | 7.0 | 6.6 | 22.5 | 12.8 | 7.8 | 5.3 |
| SC [%] | 57.6 | 59.1 | 56.2 | 57.6 | 56.6 | 56.3 |

TABLE 3

Composition of the clearcoat solutions in parts by weight

| | V1 | V2 | E1 | E2 | E3 | E4 |
|---|---|---|---|---|---|---|
| Acrylate V1[1] | 90.- | — | — | — | — | — |
| Acrylate V2[1] | — | 90.- | — | — | — | — |
| Acrylate E1[1] | — | — | 90.- | — | — | — |
| Acrylate E2[1] | — | — | — | 90.- | — | — |
| Acrylate E3[1] | — | — | — | — | 90.- | — |
| Acrylate E4[1] | — | — | — | — | — | 90.- |
| Tinuvin 292[2] | 0.9 | 0.9 | 0.9 | 0.9 | 0.9 | 0.9 |
| Tinuvin 1130[3] | 0.9 | 0.9 | 0.9 | 0.9 | 0.9 | 0.9 |
| DBTL solution[4] | 2.0 | 2.0 | 2.0 | 2.0 | 2.0 | 2.0 |
| Leveling agent solution[5] | 3.8 | 3.8 | 3.8 | 3.8 | 3.8 | 3.8 |
| Butylglycol acetate | 2.4 | 2.4 | 2.4 | 2.4 | 2.4 | 2.4 |
| Solids content | 55% | 52% | 54% | 54% | 53% | 53% |

Explanations for Table 3
[1] acrylate resin solutions described under section I.1 to I.6.
[2] commercial light stabilizer from Ciba Geigy based on a sterically hindered amine (HALS)
[3] commercial light stabilizer from Ciba Geigy based on benzotriazole
[4] catalyst solution described under section II.3.
[5] leveling agent solution described under section II.4.

TABLE 4

Composition of the coating compositions based on the clearcoat solution E1 and properties of the resulting coatings

| Example | 1 | 2 | 3 | 4 |
|---|---|---|---|---|
| Clearcoat solution E1 | 100 | 100 | 100 | 100 |
| Adjustinent additive | 30 | 30 | 30 | 30 |
| Curing agent[1] E1 | 50 | — | — | — |
| E2 | — | 50 | — | — |
| E3 | — | — | 50 | — |
| E4 | — | — | — | 50 |
| Viscosity [s][2] | 15 | 15 | 16 | 17 |
| Viscosity after 2 h [s][2] | 17 | 17 | 18 | 19 |

TABLE 4-continued

Composition of the coating compositions based on the clearcoat solution E1 and properties of the resulting coatings

| Example | 1 | 2 | 3 | 4 |
|---|---|---|---|---|
| Mar test[3] | <1 | 7 | 8 | 24 |
| Crosshatch[4] | Gt2 | Gt2 | Gt2 | Gt2 |
| Hardness[5] | 3B | 3B–2B | 3B–2B | 3B–2B |
| Volvo test[6] | ml/gl | ml/gl | ml/gl | ml/gl |
| Topcoat appearance[7] | satisf. | satisf. | satisf. | satisf. |

TABLE 5

Composition of the coating compositions based on the clearcoat solution E2 and properties of the resulting coatings

| Example | | 5 | 6 | 7 | 8 |
|---|---|---|---|---|---|
| Clearcoat solution E2 | | 100 | 100 | 100 | 100 |
| Adjustment additive | | 30 | 30 | 30 | 30 |
| Curing agent[1] | E1 | 50 | — | — | — |
| | E2 | — | 50 | — | — |
| | E3 | — | — | 50 | — |
| | E4 | — | — | — | 50 |
| Viscosity [s][2] | | 15 | 15 | 16 | 17 |
| Viscosity after 2 h [s][2] | | 17 | 17 | 18 | 19 |
| Mar test[3] | | 5 | 8 | 18 | 24 |
| Crosshatch[4] | | Gt1 | Gt1–2 | Gt1–2 | Gt1 |
| Hardness[5] | | 2B–3B | 2B | 2B | 2B-B |
| Volvo test[6] | | ml/gl | ml/gl | ml/gl | ml/gl |
| Topcoat appearance[7] | | satisf. | satisf. | satisf. | satisf. |

TABLE 6

Composition of the coating compositions based on the clearcoat solution E3 and properties of the resulting coatings

| Example | | 9 | 10 | 11 | 12 |
|---|---|---|---|---|---|
| Clearcoat solution E3 | | 100 | 100 | 100 | 100 |
| Adjustment additive | | 30 | 30 | 30 | 30 |
| Curing agent[1] | E1 | 50 | — | — | — |
| | E2 | — | 50 | — | — |
| | E3 | — | — | 50 | — |
| | E4 | — | — | — | 50 |
| Viscosity [s][2] | | 15 | 15 | 16 | 17 |
| Viscosity after 2 h [s][2] | | 17 | 17 | 18 | 19 |
| Mar test[3] | | 1 | 8 | 13 | 28 |
| Crosshatch[4] | | Gt1–2 | Gt1–2 | Gt1–2 | Gt1 |
| Hardness[5] | | 2B–3B | 2B | 2B | 2B-B |
| Volvo test[6] | | ml/gl | ml/gl | ml/gl | ml/gl |
| Topcoat appearance[7] | | satisf. | satisf. | satisf. | satisf. |

TABLE 7

Composition of the coating compositions based on the clearcoat solution E4 and properties of the resulting coatings

| Example | | 13 | 14 | 15 | 16 |
|---|---|---|---|---|---|
| Clearcoat solution E4 | | 100 | 100 | 100 | 100 |
| Adjustment additive | | 30 | 30 | 30 | 30 |
| Curing agent[1] | E1 | 50 | — | — | — |
| | E2 | — | 50 | — | — |
| | E3 | — | — | 50 | — |
| | E4 | — | — | — | 50 |
| Viscosity [s][2] | | 14 | 14 | 15 | 16 |
| Viscosity after 2 h [s][2] | | 15 | 15 | 17 | 17 |
| Mar test[3] | | 3 | 3 | 4 | 6 |
| Crosshatch[4] | | Gt1 | Gt1 | Gt1 | Gt1 |
| Hardness[5] | | 2B–3B | 2B–3B | 2B–3B | 2B-B–3B |
| Volvo test[6] | | ml/gl | ml/gl | ml/gl | ml/gl |
| Topcoat appearance[7] | | satisf. | satisf. | satisf. | satisf. |

TABLE 8

Composition of the coating compositions based on the clearcoat solution V1 and V2 and properties of the resulting coatings

| Example | | V1 | V2 | V3 | V4 | V5 | V6 | V7 | V8 |
|---|---|---|---|---|---|---|---|---|---|
| Clearcoat solution V1 | | 100 | 100 | 100 | 100 | — | — | — | — |
| Clearcoat solution V2 | | — | — | — | — | 100 | 100 | 100 | 100 |
| Adjustment additive | | 30 | 30 | 30 | 30 | 30 | 30 | 30 | 30 |
| Curing agent[1] | E1 | 50 | — | — | — | 50 | — | — | — |
| | E2 | — | 50 | — | — | — | 50 | — | — |
| | E3 | — | — | 50 | — | — | — | 50 | — |
| | E4 | — | — | — | 50 | — | — | — | 50 |
| Viscosity [s][2] | | 15 | 15 | 16 | 17 | 14 | 15 | 15 | 17 |
| Viscosity after 2 h [s][2] | | 18 | 19 | 20 | 23 | 17 | 17 | 18 | 19 |
| Mar test[3] | | <1 | <1 | <1 | <1 | 78 | 80 | 83 | 84 |
| Crosshatch[4] | | Gt5 | Gt5 | Gt5 | Gt5 | Gt0–1 | Gt1 | Gt1 | Gt0–1 |
| Hardness[5] | | >3B | >3B | >3B | >3B | B | HB–B | HB–B | HB–B |
| Volvo test[6] | | ml/gl | ml/gl | ml/gl | ml/gl | ml/gl | ml/gl | ml/gl | ml/gl |
| Topcoat appearance[7] | | satisf. | satisf. | satisf. | satisf. | satisf. | satisf. | satisf. | satisf. |

Explanations for Table 4 to 8

The tests indicated in Tables 4 to 8 are carried out as follows:

1) curing solutions described under section II.1.
2) viscosity, measured as flow time from the DIN 4 cup directly and 2 h after preparation of the coating composition
3) The mar resistance was determined using a steel cylinder weighing 2 g which is provided on the bottom face with a 2 cm thick rubber disk having a diameter of 4.5 cm, which is covered in turn on the bottom face with a nylon fabric having a mesh size of about 30 μm. The cylinder is placed vertically on the coated panel to be tested. The overall construction is connected via a rod, just above the rubber disk, to an eccentric disk which is driven by a motor. The size of the disk is chosen such that a path of about 10–15 cm in length is produced parallel to the surface of the test panel.

Procedure:

Testing is carried out using the coated steel panels described above, having a size of about 10×20 cm. The test panel is wetted with about 0.5 ml of an aqueous solution which contains surfactant. The test cylinder is then mounted. 80 double strokes are made over the surface within a period of about 80 s. Subsequently, after 1 h, the DL value is measured vertically to the direction of movement of the cylinder under an angle of observation of 20° with respect to the surface (DL value measured in accordance with DIN 6174, standard light source D, 3 angle measuring instrument MMK111 from Datacolor).

4) The crosshatch was determined by applying a 1 mm long crosscut to the cleaned, grease-free test panel, using the automatic crosshatch instrument model 430 from Erichsen GmbH, Hemer-Sundwig, Germany. The cut site is cleaned using a brush. A wooden spatula is used to press on Tesaband® 4651 adhesive tape, which is then removed with a yank.

The evaluation is carried out in accordance with DIN 53151.

5) The pencil hardness was determined using pencils from Faber Castell, Germany.

The pencil points are ground flat for this test, using P400 sandpaper, in an angle of about 90°. Marks about 5 cm long are then made on the coated surface, by hand, at an angle of 45°. This is done using a pressure such that the pencil point just fails to break.

Evaluation: a record is made of the grade of pencil with which no further marking can be seen on the coated surface.

6) Volvo crack test:
   Test conditions 1 cycle:
      4 h at 50° C. in an oven
      2 h at 35° C. and 95–100% rel. atmospheric humidity
      2 h at 35° C. and 95–100% rel. atmospheric humidity and 2 l of sulfur dioxide
      16 h at −30° C. in a deep-freeze cabinet
      Wash panel with water and dry
   Evaluation:
      Degree of blistering in accordance with DIN 53209
      Cracks ASTM D660

Summary of the Test Results

Although the coatings of Comparison Examples 1 to 4 are of good mar resistance, the adhesion (crosshatch test) and the hardness are completely inadequate.

Although the coatings of Comparison Examples 5 to 8 show a good adhesion to the basecoat (crosshatch test) and good hardness, the mar resistance of the resulting coatings is completely inadequate. The mar resistance is also not improved by variation of the curing agents.

The comparison of Examples 1 to 12 with the Comparison Examples 1 to 8 shows that, by using a mixture of hydroxypropyl methacrylate and hydroxybutyl acrylate as monomer component, the adhesion to the basecoat and the hardness of the resulting coating is distinctly improved in comparison with the use of hydroxybutyl acrylate as the sole monomer component. At the same time however, despite the use of hydroxypropyl methacrylate, the mar resistance of the resulting coatings is at least adequate (Examples 4, 8 and 12) and can be further improved by an appropriate choice for the composition of the curing solution (good to very good mar resistance in Examples 1 to 3, 5 to 7 and 9 to 11). Furthermore, Examples 1 to 12 show that, although the mar resistance decreases as the proportion of hydroxypropyl methacrylate rises (but at the same time, however, the hardness and adhesion increase), this reduction in mar resistance can be compensated, at least partially, however, by an increased proportion of the curing component (B2).

What is claimed is:

1. A coating composition comprising a binder consisting of
   (A) a hydroxyl group containing polyacrylate resin, and
   (B) at least one crosslinking agent, wherein
      1.) component (A) consists of the reaction product obtained by polymerizing
         (a) from 10 to 51% by weight of a mixture comprising
            (a1) one or more monomers selected from the group consisting of 4-hydroxy-n-butyl acrylate, 4-hydroxy-n-butyl methacrylate, 3-hydroxy-n-butyl acrylate, 3-hydroxy-n-butyl methacrylate, and
            (a2) one or more monomers selected from the group consisting of 3-hydroxy-n-propyl acrylate, 3-hydroxy-n-propyl methacrylate, 2-hydroxy-n-propyl acrylate, 2-hydroxy-n-propyl methacrylate,
         (b) from 0 to 20% by weight of one or more monomers selected from the group consisting of hydroxyl group-containing esters of acrylic acid or of methacrylic acid which are different from (a) and have at least 5 carbon atoms in the alcohol residue and hydroxyl group-containing esters of polymerizable ethylenically unsaturated carboxylic acids, which are different from (a),
         (c) from 28 to 85% by weight of an aliphatic or cycloaliphatic ester of acrylic acid or of methacrylic acid which is different from (a) and (b) and has at least 4 carbon atoms in the alcohol residue, or of a mixture of such monomers,
         (d) from 0 to 25% by weight of an aromatic vinyl hydrocarbon which is different from (a), (b) and (c), or a mixture of such monomers,
         (e) from 0 to 5% by weight of an ethylenically unsaturated carboxylic acid, or of a mixture of ethylenically unsaturated carboxylic acids, and
         (f) from 0 to 20% by weight of an ethylenically unsaturated monomer which is different from (a), (b), (c), (d) and (e), or of a mixture of such monomers,
      to give a polyacrylate resin having a hydroxyl number of from 60 to 200 mg of KOH/g, an acid number of from 0 to 35 mg of KOH/g and a number average molecular weight of from 1000 to 5000, the sum of the proportions by weight of components (a) to (f) being in each case 100% by weight, and further wherein
      (2.) component (B) is a mixture comprising
         (B 1) at least one polymer selected from the group consisting of aliphatic, cycloaliphatic, and araliphatic di- and polyisocyanates having an average functionality of from 3 to 4 and having a uretdione group content of not more than 5%, (B2) optionally, at least one member selected from the group consisting of polymers of aliphatic, cycloaliphatic, and araliphatic di and polyisocyanates having an average functionality of from 2 to 3 and having a uretedione group content of from 20 to 40%, and (B3) optionally, at least one aliphatic, cycloaliphatic, or araliphatic di- or polyisocyanate.

2. A coating composition according to claim 1, wherein the hydroxyl group-containing polyacrylate resin is obtained by polymerizing (a) from 10 to 35% by weight of component (a), (b) from 0 to 10% by weight of component (b), (c) from 40 to 70% by weight of component (c), (d) from 5 to 20% by weight of component (d), (e) from 1 to 3% by weight of component (e), and (f) from 0 to 15% by weight of component (f).

3. A coating composition according to claim 1, wherein the composition of component (a) is selected such that the polymerization of component (a) alone produces a polyacrylate resin having a glass transition temperature of from −62 to +65° C.

4. A coating composition according to claim 1, wherein the mixture employed as component (a) comprises from 10 to 85% by weight of component (a1) and from 15 to 90% by weight of component (a2), the sum of the proportions by weight of components (a1) and (a2) being in each case 100% by weight.

5. A coating composition according to claim 1, wherein the mixture employed as component (a) comprises (a1) at least one of 4-hydroxy-n-butyl acrylate or 3-hydroxy-n-butyl acrylate, and (a2) at least one of 3-hydroxy-n-propyl methacrylate or 2-hydroxy-n-propyl methacrylate.

6. A coating composition according to claim 1, wherein the composition of component (c) is selected such that the polymerization of component (c) alone produces a polyacrylate resin having a glass transition temperature of from −30 to 100° C.

7. A coating composition according to claim 1, wherein component (c) is selected from the group consisting of n-butyl (meth)acrylate, isobutyl (meth)acrylate, tert-butyl (meth)acrylate, furfuryl (meth)acrylate, n-hexyl (meth)acrylate, lauryl (meth)acrylate, stearyl (meth)acrylate, cyclohexyl (meth)acrylate and tert-butylcyclohexyl (meth) acrylate.

8. A coating composition according to claim 1, wherein the polyacrylate resin has a number-average molecular weight from 1800 to 3500, a hydroxyl number of from 80 to 160 mg of KOH/g and an acid number of from 0 to 25 mg of KOH/g.

9. A coating composition according to claim 1, wherein the crosslinking agent (B) is a mixture of from 40 to 100% by weight of component (B1), from 0 to 60% by weight of component (B2), and from 0 to 25% by weight of component (B3), the sum of the proportions by weight of components (B1) to (B3) being in each case 100% by weight and the proportions by weight being based in each case on the solids content.

10. A coating composition according to claim 9, wherein the crosslinking agent (B) is a mixture of from 45 to 89% by weight of component (B1), from 11 to 55% by weight of component (B2), and from 0 to 10% by weight of component (B3);

with the proviso that the acrylate resin (A) has been prepared using more than 14% by weight, based on the overall weight of the monomers (a) to (f) employed, of hydroxyl group-containing monomers which are different from (a1).

11. A coating composition according to claim 9, wherein at least one of components (B1) or (B2) is a polymer of a member of the group consisting of 3,5,5-trimethyl-1-isocyanato-3-isocyanatomethyl cyclohexane diisocyanate and hexamethylene diisocyanate.

12. A process for producing a multicoat protective and/or decorative finish on a substrate surface, comprising the steps of:

(1) applying a pigmented basecoat to the substrate surface, (2) forming a polymer film from the basecoat applied in step (1), (3) applying a transparent topcoat composition according to claim 1 to the resulting basecoat, and subsequently (4) curing basecoat and topcoat together.

13. The process according to claim 12, wherein an automotive refinish topcoat is produced.

14. A coating composition according to claim 1, wherein the composition of component (a) is selected such that the polymerization of component (a) alone produces a polyacrylate resin having a glass transition temperature of from −50 to +35° C.

15. A coating composition according to claim 1, wherein the mixture employed as component (a) comprises from 20 to 65% by weight of component (a1) and from 35 to 80% by weight of component (a2), the sum of the proportions by weight of components (a1) and (a2) being in each case 100% by weight.

16. A coating composition according to claim 1, wherein the composition of component (c) is selected such that the polymerization of component (c) alone produces a polyacrylate resin having a glass transition temperature of from −10 to +90° C.

17. A coating composition according to claim 9, wherein the crosslinking agent (B) is a mixture of from 45 to 100% by weight of component (B1), from 0 to 55% by weight of component (B2), and from 0 to 10% by weight of component (B3); with the proviso that the acrylate resin (A) has been prepared using not more than 14% by weight, based on the overall weight of the monomers (a) to (f) employed, of hydroxyl group-containing monomers which are different from (a1).

* * * * *